Figure 1:
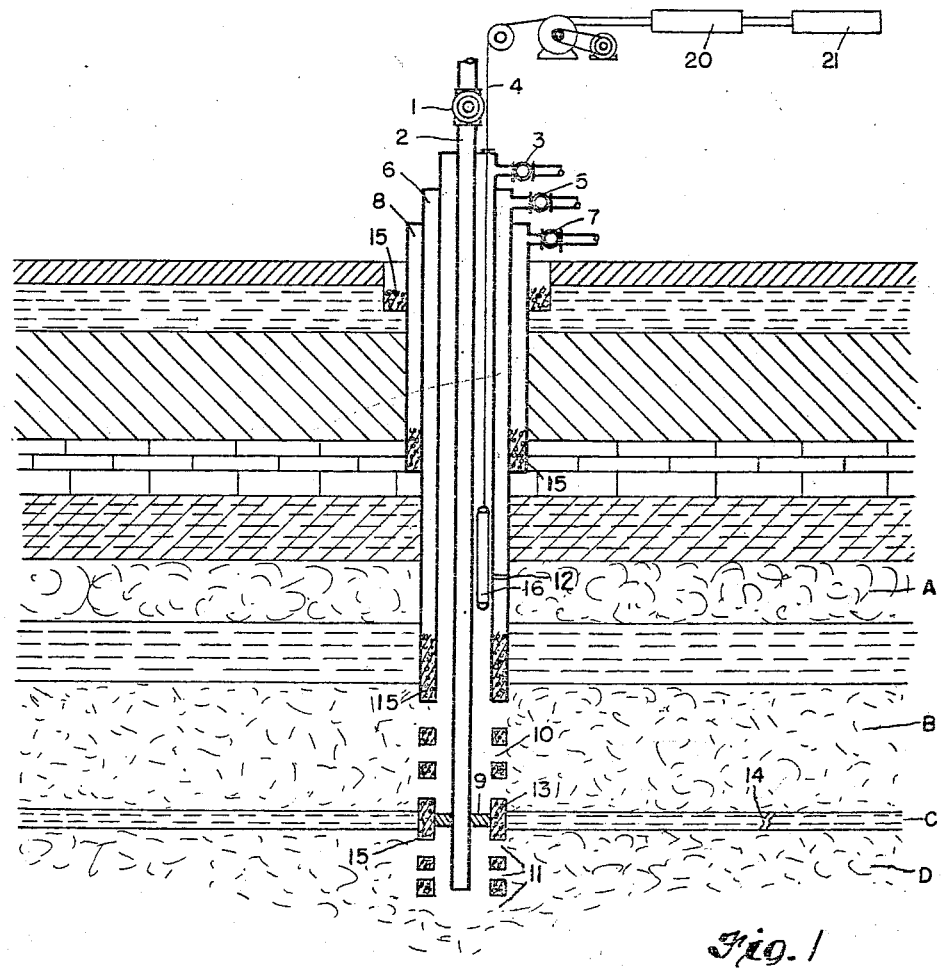

Jan. 30, 1951          H. H. HINSON          2,540,049

METHOD OF LOCATING LEAKS IN WELLS AND WELL FITTINGS

Filed Oct. 23, 1948

INVENTOR.
HOWARD H. HINSON
BY
Oberlin & Limbach
ATTORNEYS.

Patented Jan. 30, 1951

2,540,049

UNITED STATES PATENT OFFICE 2,540,049

METHOD OF LOCATING LEAKS IN WELLS AND WELL FITTINGS

Howard H. Hinson, Ponca City, Okla., assignor to Continental Oil Company, Ponca City, Okla., a corporation of Delaware Application October 23, 1948, Serial No. 56,113

5 Claims. (Cl. 250—83.6)

The present invention relates to the method for locating the point of confusion of different streams of material and particularly fungible materials. More specifically, the present invention relates to a method of locating leaks in wells and well fittings and to the detection of commingling of streams in the well and earth strata.

At the present time, this is accomplished in several ways. The more common method of determining the approximate location of a leak consists of pumping a test plug, which is very similar to a cementing plug, down the casing suspected of having the leak, following the descent of the test plug by means of the measuring line. The test plug then stops at the casing leak, and the approximate location is shown by the measuring line. After the leak has been located, a cementing job is done which is similar to that done around the shoe on a regular string of casing. Some other methods used include measurement of temperature gradients, detection through the amplification of the sound made by the substance escaping, electrical determinations of the materials encountered and determinations based on the light wave absorption characteristics of the well fluids. However, the results obtained through the aforementioned methods are only rough approximations and are often misleading due to the fact that minor changes in the conditions existing within the well bore correspondingly change the results obtained.

The present invention provides a method of determining more precisely the location of leaks in wells and well fittings and detecting the commingling of streams. It is a principal object of this invention to provide an improved method of accomplishing this desired result which is generally more satisfactory than any heretofore previously employed.

Another object of this invention is to provide a means not only to locate leaks in wells but also to locate the bypassing of fluids around packers, packing rings, and other equipment within the well, the by-passing or commingling of streams through a faulty cement job, around the casing or through fractures or porous zones between two porous earth layers that were thought to be separated by an impermeable layer.

Other objects will appear as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Broadly stated, this invention then comprises the method for locating the point of confusion of the materials in a system of first and second laterally contiguous streams which comprises introducing radioactive material into the first of such streams and moving a radioactivity sensitive instrument longitudinally of said second stream.

In the more specific embodiment of my invention, it comprises the method for locating the point of confusion of mineral oils in a system of first and second concentric streams in a single well which comprises introducing radioactive material into the first of such streams, determining the presence of such material in the second of such streams at the discharge point of such streams by means of a radioactivity sensitive instrument and determining the point of confusion by moving a radioactivity sensitive instrument longitudinally of said second stream.

In the further discussion of my improved method, it becomes helpful to illustrate by means of drawings, one way in which my invention may be practiced. In said drawings:

Fig. 1 is a vertical section of an oil well showing the casing and the concentric tubings employed for the purpose of separately producing different zones, the commingling of which producing streams is conveniently determined by practicing my new method. Also illustrated in Fig. 1 is one embodiment of the radioactivity detector and the recording means used. Fig. 1 is also illustrative of the manner in which my invention may be used to determine the location of leaks generally in a multiple tube well system of the type used.

Figure 2:
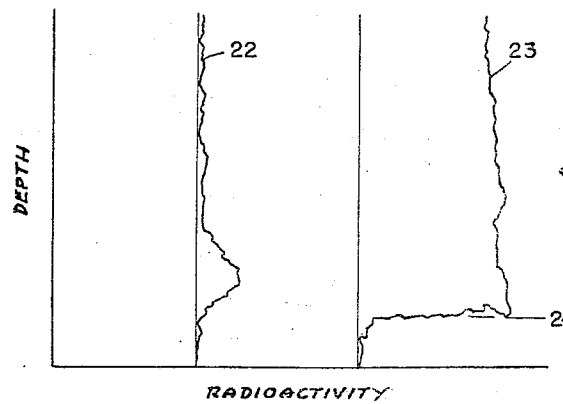

Fig. 2 is a representative log of the natural radioactivity trace of the well bore and the radioactivity trace used to locate the leaks and detecting commingling of streams in the well or earth layers.

Referring now more specifically to the drawings, Fig. 1 shows a high pressure recovery well consisting of concentric tubings 2, 4, 6 and 8. Such tubings are controlled by valves 1, 3, 5 and 7 respectively. Each tubing with the exception of No. 2 is sealed off by cementing material 15. The uncased portion of the wall of the well bore has been cemented at local areas in accordance with conventional drilling practice leaving openings 10 and 11 respectively from producing zones B and D into the well bore, the cementing collar 13 bridging or lying on the face of the stratum C of relatively impervious rock, has been placed to receive a packer member 9 which seals off producing zone B from producing zone D so that the former may be produced through the outer annular space of the wall at that level and the zone D produced through the central tubing. Crack 12 represents a hypothetical leak between annular space 6 and 4. Fracture 14 represents a leak or connection between producing layers B and D and is located in stratum C. Radioactivity detector 16 is suspended by means of line 17 in the annular space 4 over measuring sheave 18 and finally wound on drum 19.

Amplifier 20 and recorder 21 serve to permanently record the readings made by detector 16, such record constituting the log. Detector 16 and recording means 20 and 21 are of conventional design and may be any device that is responsive to radiations from radioactive material. A typical example of such detecting means is the well-known Geiger-Muller counter. Amplifier 20 and recording device 21 are familiar to those skilled in the art and no further detailed mention is necessary.

Fig. 2 shows the representative logs made under varying conditions. Trace 22 is illustrative of the natural log taken of the annular space 4 being traversed by detector 16. Although a natural log is not essential to the operation of my invention, it is highly desirable to determine the natural radiations existing in such annular space before any radioactivity log is made in order to be better able to evaluate the results obtained by subsequent traverses. Trace 23 represents a typical record of a log made after the addition of radioactive materials into the annular space. Point 24 signifies the leak between annular spaces 6 and 4 to be at that particular location. In Fig. 2 depth is indicated on the vertical line while the degree of radioactivity is indicated on the horizontal line. Thus, from a careful study of the record made, the exact location of the point sought is determined and suitable means may be taken to insure continued operation.

In the practical operation of my invention, radioactive material is introduced through valve 5 and into annular space 6. In the usual operation of high pressure recovery, gas or liquid is pumped into one annular space under pressure sufficient to overcome the formation pressure existing in the well. Well fluids will then be forced or lifted up the low pressure or producing tubing and out into collection means. My invention utilizes this high pressure recovery procedure by the injection of radio-active materials into the high pressure region of the well-fittings and the emergency of such radioactive material at the low pressure side of the well fittings. A radio-active material is then forced down into annular space 6 through leak 12 and into annular space 4 by pumping gas under pressure sufficient to overcome the natural formation pressure of the well fluid. If gas and/or oil are allowed to flow from annular space 4 through control valve 3, the radioactive material introduced in annular space 6 travels through leak 12 into annular space 4 and out of valve 3. The presence of radioactive material from annular space 6 in annular space 4 is first detected in the effluent from annular space 4 through valve 3 where a Geiger-Muller counter is constantly located to determine increase in radioactivity at such point. After the radioactive material has been determined in the effluent from annular space 4, the Geiger-Muller counter is then sent down annular space 4 to locate the exact position of leak 12. Trace 23 clearly illustrates the point at which the increase in radioactivity is abrupt, indicating the exact location of the leak.

It is possible in the operation of my invention to determine not only the position of one leak but also any other leaks that might exist between annular spaces 4 and 6. It is also possible, through the operation of my invention, to locate the by-passing of streams through faulty cement jobs 15, around well packer 9, and even to determine the commingling of streams from producing zone B to D through fissure or crack 14 in stratum C, thus enabling one skilled in the art to determine whether the material from more than one producing zone finds its way into a single effluent stream. To accomplish this result, radioactive material is introduced into annular space 2 through valve 1 and forced down in the aforementioned method into annular space 2 and into producing zone D. Should the injected radioactive material be detected in the effluent from annular space 4, this indicates a direct connection between zones B and D through zone C. The method and procedure of my invention is not confined to the use of gas to serve as a carrier of the radioactive material, as any fluid material may be substituted with equal results.

The radioactive materials used in the operation of my invention may be either naturally radioactive materials or materials made radioactive by artificial means. Examples of these are fission products, separated radioisotopes, irradiated substances, cyclotron-produced radioactive materials and betatron produced radioactive materials. At the present time, these materials may be readily obtained as by-products of the nuclear fission researches conducted by the Government. Although not necessary in the practical operation of my invention, the use of rapidly decaying radioactive material is preferred. This is to lessen the possibility of long lasting radiations masking the true condition of well characteristics in tests made within a reasonable length of time after previously injections. The above materials have been mentioned only by way of example and it should be noted that any substance may be employed which is either naturally radioactive or capable of being rendered radioactive artificially.

The preferred concentration range of the radio-active material in the carrier substance is of the order of $1.7 \times 10^{-6}$ curies per barrel to $4.2 \times 10^{-5}$. Concentrations above and below the values given will be necessary depending on the radioactive substance used, the characteristics of the conditions being investigated, and the amount of diffusion or dilution of the curies substance. Concentrations of different magnitude may be used simultaneously or sequentially to determine conditions not evident by a single application of radioactive tracer material or by multiple applications of the same concentrations.

After the exact location of the leak in a well or well fitting or the point of confusion has been determined, the usual means may be undertaken to repair the break.

While the present invention is particularly adapted to the determination of the point of confusion of fungible material, including similar or mutually interchangeable materials, it is equally adaptable to substances not fungible, as for example, gas, water and oil.

Other modes of applying the principle of the invention may be employed, change being made as regards the details described, provided the features stated in any of the following claims, or the equivalent of such, be employed.

I therefore particularly point out and distinctly claim as my invention:

1. The method for locating the point of confusion of the materials in a system of first and second laterally contiguous streams which comprises introducing radioactive material into the first of such streams, determining the presence of such material in the second of such streams at a fixed point in the system and determining the point of confusion by moving a radioactivity sensitive instrument longitudinally of said second stream.

2. The method for locating the point of confusion of the materials in a system of first and second laterally contiguous streams which comprises introducing radioactive material into the first of such streams, determining the presence of such material in the second of such streams at a fixed point in the system by means of a radioactivity sensitive instrument and determining the point of confusion by moving a radioactivity sensitive instrument longitudinally of said second stream.

3. The method for locating the point of confusion of the materials in a system of first and second laterally contiguous streams which comprises introducing radioactive material into the first of such streams, determining the presence of such material in the second of such streams at a discharge point of such stream by means of a radioactivity sensitive instrument and determining the point of confusion by moving a radioactivity sensitive instrument longitudinally of said second stream.

4. The method for locating the point of confusion of fungible materials in a system of first and second laterally contiguous streams which comprises introducing radioactive material into the first of such streams, determining the presence of such material in the second of such streams at a discharge point in the system by means of a radioactivity sensitive instrument and determining the point of confusion by moving a radioactivity sensitive instrument longitudinally of said second stream.

5. The method for locating the point of confusion of mineral oils in a system of first and second concentric streams in a single well which comprises introducing radioactive material into the first of such streams, determining the presence of such material in the second of such streams at the discharge point of such stream by means of a radioactivity sensitive instrument and determining the point of confusion by moving a radioactivity sensitive instrument longitudinally of said second stream.

HOWARD H. HINSON.

REFERENCES CITED

The following references are of record in the file of this patent:

UNITED STATES PATENTS

| Number | Name | Date |
|---|---|---|
| 2,346,043 | Mysels | Apr. 4, 1944 |
| 2,429,577 | French | Oct. 21, 1947 |